No. 768,862. Patented August 30, 1904.

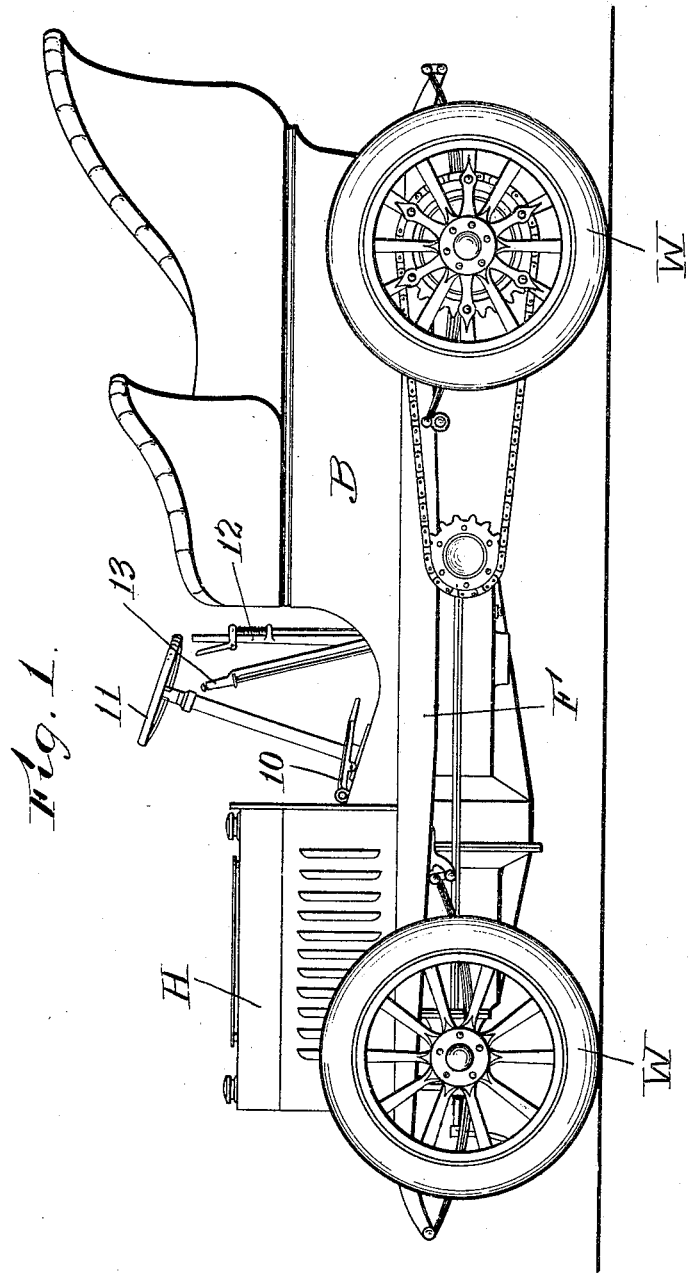

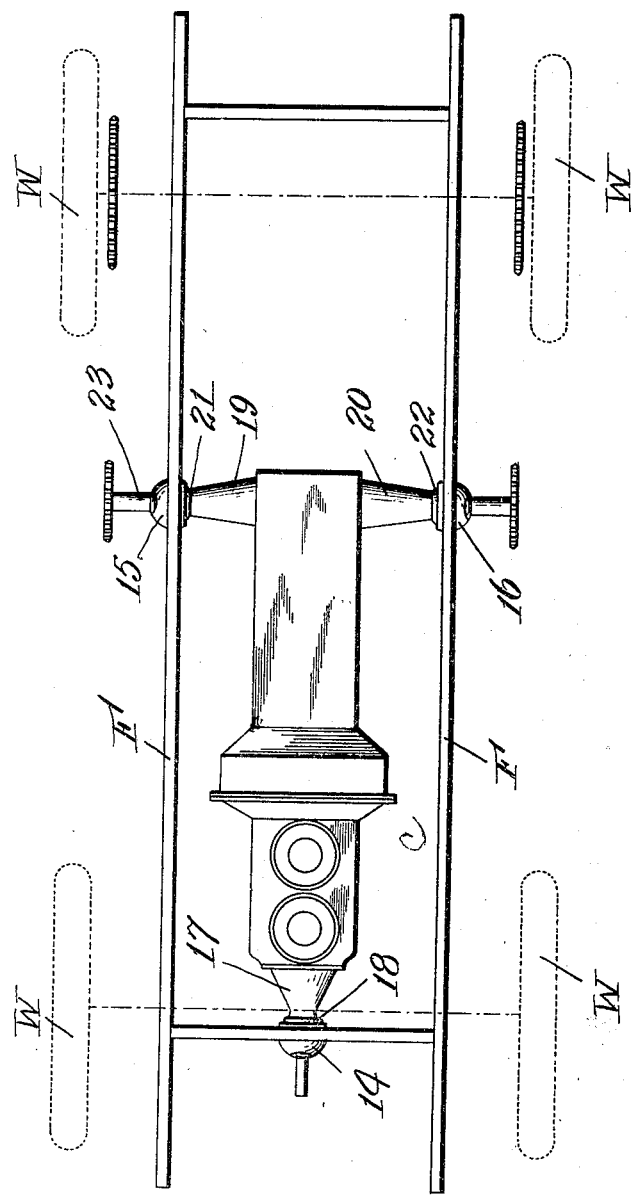

UNITED STATES PATENT OFFICE.

RALPH L. MORGAN, OF WORCESTER, MASSACHUSETTS.

MOTOR-VEHICLE.

SPECIFICATION forming part of Letters Patent No. 768,862, dated August 30, 1904.

Application filed February 29, 1904. Serial No. 195,758. (No model.)

*To all whom it may concern:*

Be it known that I, RALPH L. MORGAN, a citizen of the United States, residing at Worcester, in the county of Worcester and State of Massachusetts, have invented a new and useful Motor-Vehicle, of which the following is a specification.

This invention relates to a construction for supporting the engine-casing of an automobile.

The especial object of this invention is to provide a construction in which the engine-casing is combined with the framework in such a way that the framework may be twisted or bent without injuring the engine-casing.

To these ends this invention consists of the improved construction and combinations of parts, as hereinafter described, and more particularly pointed out in the claims at the end of this specification.

In the accompanying drawings, Figure 1 is a side view of sufficient parts of an automobile to illustrate the application of my invention thereto, and Fig. 2 is a diagrammatic plan view illustrating the way in which the engine-casing is supported in the framework of the carriage.

In running automobiles, particularly in using automobiles on comparatively rough and uneven roads, heavy strains are necessarily imposed upon the running-gear and framework of the carriage. If the running-gear and carriage-framework are properly constructed, they will possess sufficient flexibility to permit them to yield or give to these running strains. The motor itself and the parts which are directly operated thereby are necessarily constructed of metal, and it is essential that absolute rigidity should be maintained. To accomplish this, a number of different constructions have been employed for providing yielding or spring supports for the motor-casing; but in all such constructions with which I am familiar more or less of the running strains are transmitted to the engine and the driving connections of the carriage.

The especial object of my present invention is to combine the carriage-framework of an automobile with the engine-casing in such a simple and direct manner that the carriage-framework may have a considerable degree of flexibility without straining or otherwise injuring the engine-casing and the parts inclosed therein.

Referring to the accompanying drawings and in detail, as shown in Fig. 1, the automobile which is illustrated as embodying this invention comprises a framework F. Supported at the front of the framework F is the usual bonnet H, which incloses the engine-cylinders, and also supported on the framework F is the body B, containing the seats for the occupants of the automobile. Arranged in position to be controlled from the front seat are the usual controlling devices. In the present instance such controlling devices include the clutch-lever 10, the steering-wheel 11, the regulating-handle 13, and a brake-lever 12. The framework is supported by suitable springs on the ordinary front and rear axles and by means of the wheels W.

The parts as thus far described may be of the usual or ordinary form.

The engine-casing is mounted in and supported by the framework of the carriage. The shape of the engine-casing and the manner in which the same is supported in the framework F is most clearly illustrated in the second sheet of drawings. As shown in Fig. 2, the framework F is of rectangular form, comprising comparatively long side bars connected by front and rear cross-bars. Mounted upon or formed with the front cross-bar is a socket 14, and mounted upon or formed with the side bars of the rectangular frame F are socket-pieces 15 and 16. The engine-casing C is provided at its forward end with a projection 17, terminating in a ball 18, fitting into the socket 14. Projecting from the opposite sides of the casing C near its rear end are projections 19 and 20, which are provided at their ends with balls 21 and 22, which fit into the sockets 15 and 16, respectively. By means of this construction it will be seen that the engine-casing C has three points of support in a rectangular carriage-framework, one point of support being in the front cross-bar of the framework at the forward end of the engine-casing and the other two points of support being universal joints with the side bars of the rectangular carriage-framework.

In the actual use of an automobile as thus constructed it has been found that the rectangular framework can be considerably warped or twisted from its normal shape without straining or injuring the engine-casing. This particular construction also provides a convenient and direct way of arranging the driving connections. For this purpose a driving-shaft 23 is journaled in the projections 19 and 20 at the rear end of the engine-casing, and secured on the ends of the driving-shaft 23 are the ordinary sprocket-wheels, from which the rear wheels may be driven by the ordinary drive-chains D, as illustrated in Fig. 1.

I am aware that numerous changes may be made in practicing my invention by those who are skilled in the art without departing from the scope thereof as expressed in the claims. I do not wish, therefore, to be limited to the particular construction I have herein shown and described; but What I do claim, and desire to secure by Letters Patent of the United States, is—

1. In an automobile, the combination of a framework, having side pieces and a cross-bar, an engine-casing having one end connected by a universal joint with the cross-bar of the framework and having oppositely-extending projections near the other end of the engine-casing connected by universal joints with the side bar of the framework and a power-shaft journaled in the last two named projections with its ends extending beyond the side bars of the framework.

2. In an automobile, the combination of a rectangular framework, an engine-casing having a projection at its front end connected by a universal joint with the front cross-bar of the framework, and oppositely-extending projections near the rear end of the engine-casing connected by universal joints with the side bars of the framework, and a power-shaft journaled in the last two named projections with its ends extending beyond the side bars of the framework.

3. In an automobile, the combination of a rectangular framework, an engine-casing having a projection at its forward end connected by a universal joint substantially to the center of the front cross-bar, and having oppositely-extending projections near its rear end connected by universal joints to the side bars of the rectangular framework, a power-shaft journaled in the last two named projections, and extending beyond the side bars of the framework, and sprocket-wheels secured on the ends of the power-shaft and connected to drive the rear wheels of the vehicle.

In testimony whereof I have hereunto set my hand in the presence of two subscribing witnesses.

RALPH L. MORGAN.

Witnesses:
WILLARD A. WINN,
FRANK M. LORD.